May 13, 1958 R. EMERIAT 2,834,827
FLAT TYPE BATTERY AND METHOD OF MANUFACTURE THEREOF
Filed Jan. 20, 1955 3 Sheets-Sheet 1
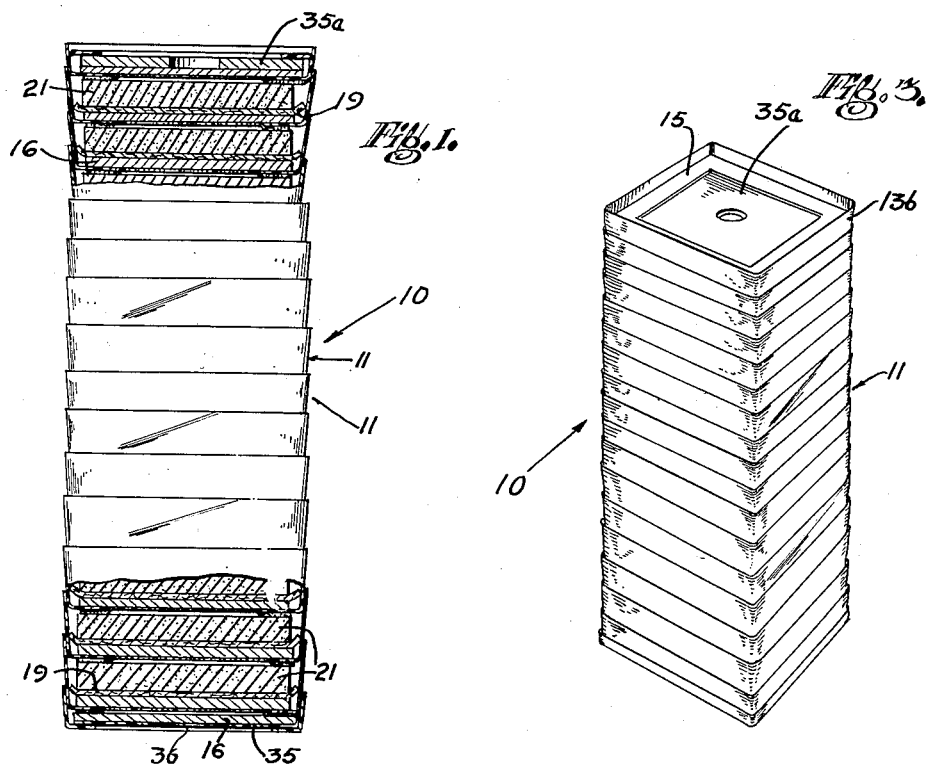
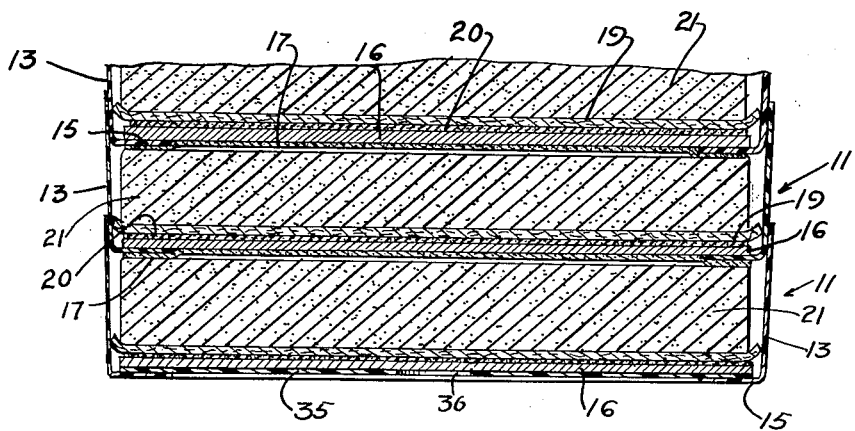
INVENTOR
Raymond Emeriat
BY
Kenyon & Kenyon
ATTORNEYS

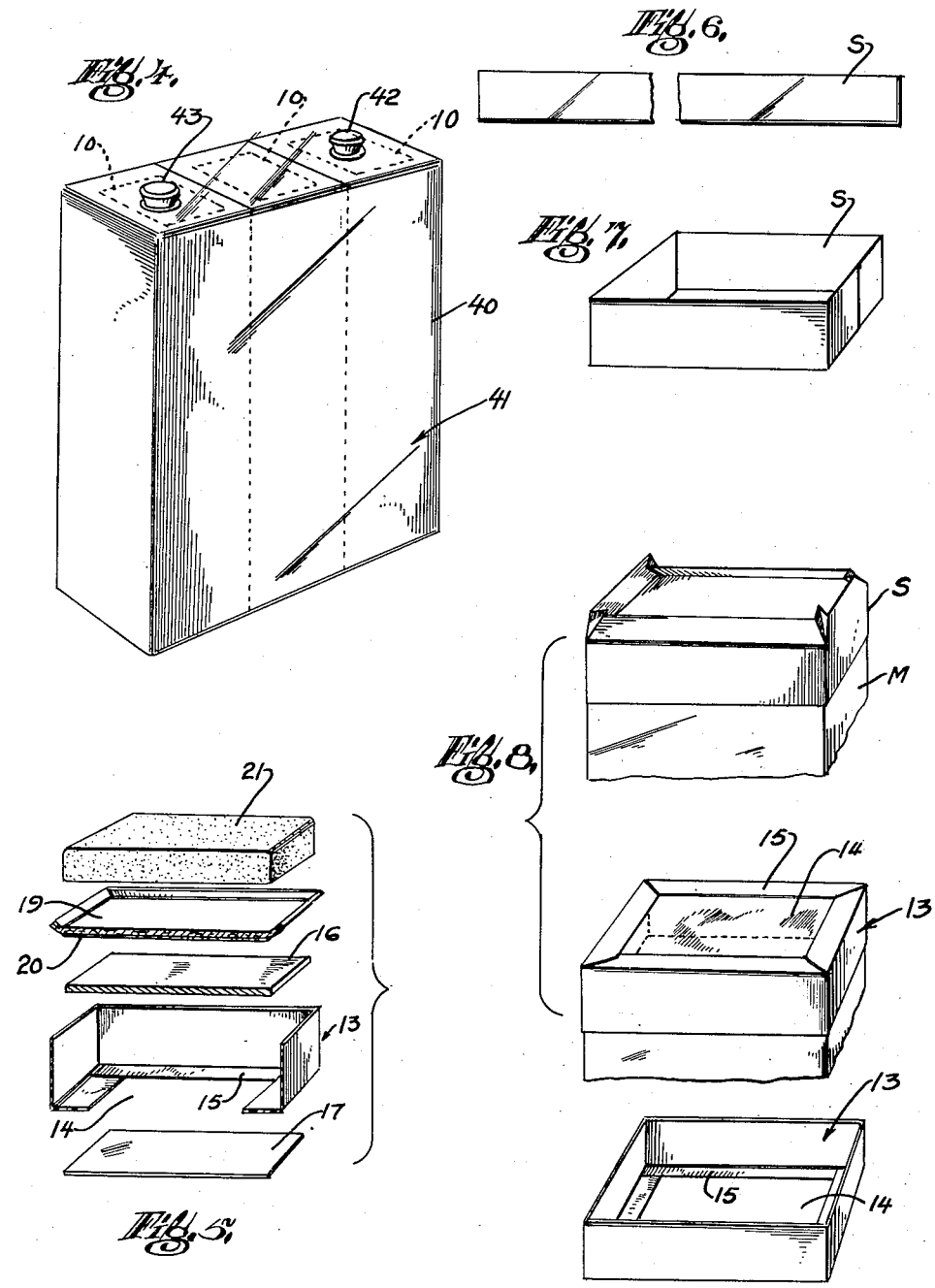

May 13, 1958  R. EMERIAT  2,834,827
FLAT TYPE BATTERY AND METHOD OF MANUFACTURE THEREOF
Filed Jan. 20, 1955  3 Sheets-Sheet 3
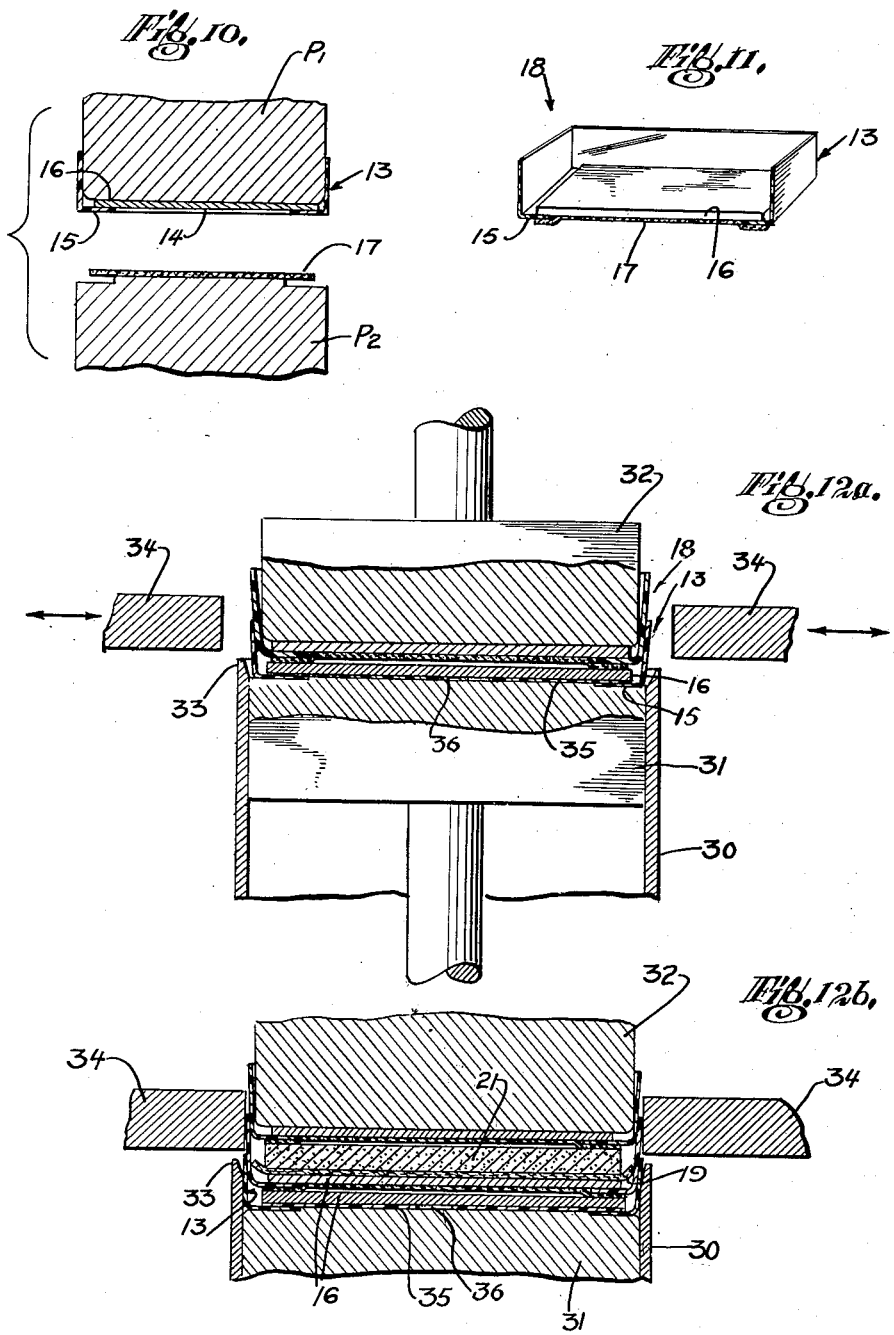

United States Patent Office 2,834,827
Patented May 13, 1958

2,834,827

FLAT TYPE BATTERY AND METHOD OF MANUFACTURE THEREOF

Raymond Emeriat, Paris, France, assignor to Societe de la Pile Leclanche, Chasseneuil du Poitou, France, a French company Application January 20, 1955, Serial No. 483,087

Claims priority, application France January 27, 1954

13 Claims. (Cl. 136—111)

This invention relates to batteries and more particularly to batteries composed of flat-type cells which are piled to form the battery and to methods of manufacture thereof.

Batteries of the type in question and processes of manufacturing such batteries are presently known. However, the batteries and manufacturing procedures are not believed to have been developed to the highest stage of perfection.

Among the detrimental features of the presently known methods of producing such batteries are the following:

In the manufacturing process there has heretofore been considerable waste of materials from which the individual components of the battery are assembled. In addition, some of the components have been of complicated shape and as a result have required additional operational steps for their production.

In addition, batteries have included waste space and have been of excessive dimensions for their rated capacities because of the peculiar shapes of individual components of the respective cells and, in addition, the thickness of the material used for the casings of the individual cells. In addition, poor fit of the components into the individual cell casings has caused looseness of the latter in the casings. Additionally, auxiliary binding means such as adhesive tapes or the like have been required for maintaining the cells in the required closely-fitting sealing relationship necessary for battery operation. In effect, therefore, there has been a requirement for an excess of materials necessary for creating and preserving the piled battery cells in assembled relationship.

In addition, the customary procedure in assembling the piles of flat cells has been to gather together the number of cells required for a given battery into a pile and thereafter impart a single pressure to the entire pile as a unit during the binding and sealing together of the individual cells in the pile. The pressure applied to the pile as a whole during such sealing and during the application of an overall binding to secure the compressed pile in assembled relationship is found to be irregularly distributed in the individual cells of the pile both during and after completion of the sealing and binding process. In consequence, the electrical performances of different batteries varies considerably even though all have been produced by the same process and have the same dimensional characteristics.

The variation in electrical performance which results from the irregular distribution of pressure depends upon the fact that uniformity of contact between engaging surfaces of adjacent cells is difficult to secure. In addition, sufficiency of contact between two adjacent cells varies with consequent variation in the ohmic resistance of the battery. Furthermore, the irregularity in pressure distribution makes it difficult to insure leak-proof sealing between adjacent cells in the absence of which current leakages occur.

Besides excessive variation in performance characteristics, batteries made by the presently known procedures are too costly both because of excessive use of raw materials and because of large labor costs required for their production.

Objects and features of the present invention are to provide batteries of the kind in question and procedures for their manufacture in which the detrimental features in present batteries and their processes of manufacture noted herein are eliminated or materially reduced.

Additional features and objects are to provide a battery-manufacturing process which is substantially simpler and cheaper when compared with the presently known processes.

The battery of the present invention comprises a plurality of individual flat cells piled up in required number to provide a battery block with the desired output rating. Each of the cells embodies a pair of trays, each preferably of a thermoplastic material between which the other components of the cell are enclosed. Each of the trays which are adapted to be nested one into the other is provided with a large bottom aperture and the depth of each tray is slightly in excess of the depth of a cell which is to be formed therefrom. The bottom of each tray is closed over or covered internally by a small metallic plate of zinc, for example, which is shaped to fit the internal dimensions defined by the side walls of the tray. This plate which constitutes the anode of the individual cell is sealed to the bottom of the tray around the aperture by a conductive coating applied both to the plate through the bottom opening or aperture of the tray and to the outer face of the bottom peripheral flange of the tray defining the bottom opening. The conductive coating thus serves to adhere the plate to the tray and to act as a tight joint with the flange defining said opening. The other cell components are superposed upon the zinc plate within the tray. The cell is then completed by superposing or nesting the bottom of a second tray within the first tray above its contents and sealing the second tray to the first tray by welding of the upper peripheral side wall edges of the lower tray to the bottom of the second tray.

The welding of the two trays is effected preferably by appropriate application of high frequency heating electrodes to the necessary wall parts of the two trays during the welding process and by simultaneouly maintaining pressure of a determined amount between the two nested trays and the cell components included between them.

When a pair of cell trays has been assembled in the manner indicated, a third tray is positioned or nested in the second tray over the contents of the latter. The same pressure previously applied between the first and second trays is then exerted between the third tray and the second tray and the sealing of the peripheral edges of the second tray to the bottom of the third tray is now effected. Thereafter required contents are inserted into the third tray and the next tray is superposed on the third tray and sealed thereto under pressure as above described, and as many additional trays in sequence as superposed and assembled in the same way with those previously assembled. The sealing of each succeeding tray to the one below it provides (when the assembly has been completed) for an overall unitary envelope or covering for the battery consisting of the welded walls of the trays of the individual cells of the assembly. With this arrangement it is not necessary to apply any external binding of any kind to the assembly to maintain it in united condition. Moreover, because the trays of each succeeding individual cell are united to the already united trays of all the preceding cells under precisely the same amount of pressure applied individually to each succeeding cell, the contacts between adjacent cells are uniform throughout and any number of battery blocks assembled in the manner described all show uniform operating characteristics.

Other objects and features of the invention will become apparent from the folowing specification and the accompanying drawings, wherein:

Fig. 1 is in part a vertical cross section and in part an elevational view of a complete battery block of nestedly-stacked cells prepared in accord with this invention;

Fig. 2 is a fragmentary sectional view on an enlarged scale of a portion of the battery of Fig. 1;

Fig. 3 is a perspective view of the battery block of Fig. 1;

Fig. 4 is a perspective view of a battery composed of several of the blocks of Fig. 3;

Fig. 5 is a vertical exploded sectional view of elements of a cell group;

Figs. 6–8, inclusive, are diagrammatic views of successive procedural steps in the manufacture of battery trays used in the process;

Fig. 9 is a perspective view of a completed tray;

Fig. 10 is a diagrammatic view of the manner of assembly of a tray with a metallic anode and a conductive coating to form a tray unit;

Fig. 11 is a sectional view of a tray unit; and

Figs. 12a and 12b are diagrammatic views of sequential steps in assembling piled up cells of the invention.

Referring to the drawing, the reference character 10 denotes a battery block made up of a pile of individual flat quadrangularly-shaped cell units 11 so that in the overall shape the block 10 is a parallellopiped. The individual cell units 11 are piled up or superposed upon each other and each consists of a tray 13 made of a suitable dielectric and thermoplastic material to permit uniting and sealing of a plurality of superposed trays carrying the cell unit components to each other to form the battery block 10 consisting of a plurality of cells.

Any suitable thermoplastic synthetic resins or other thermoplastic materials may be employed in manufacturing the trays. Vinyl resins, various cellulose compounds and other materials possessing the desired dielectric and thermoplastic properties may be used. Preferably these trays are manufactured from thin rectangular plastic strips S (Fig. 6) of the order of 0.15 mm. thickness cut from a roll of plastic sheet material of the same thickness and having desired width. The individual strips S are folded about the sides of a mandrel M (as seen in Fig. 8) having rectangular section of required internal tray dimensions with areas overlapping the end of the mandrel. This forms a quadrangular prism with an opening 14. The overlapping areas or borders of the strips S are folded down over the end to provide a peripheral flange 15 for the opening 14. Terminal flap portions at the corners resulting from the folding are bent at right angles to the flange and welded thereto at the corners as by heat. The rectangular opening 14 with the marginal flange 15 around the opening lies at the bottom of the completed tray 13 as seen in perspective in Fig. 9.

An anode plate 16, for example, of zinc, is then inserted into each tray 13 (Fig. 10). The plate 16 is of such dimensions that it practically fills the entire inner surface of the tray bottom and rests upon the marginal flange 15 over the bottom opening 14. A thin conductive coating plate 17 of similar shape and area as that of zinc plate 16 is rendered tacky or is provided with an adhesive coating and positioned for application to the bottom of the plate carrying tray 13, and for union with the surface of plate 16 appearing in opening 14, and with the bottom face of the marginal flange 15 under pressure provided by the movable pistons $P_1$ and $P_2$. This pressure slightly distorts the plate 17 to permit its effective bonding to the surface of anode plate 16 appearing in opening 14 and to the bottom of the marginal flange 15, thus tightly sealing the opening in the bottom of tray 13 (see Fig. 11).

The anode plates 16 preferably and for convenience of manufacture are cut individually to required length from a zinc strip having required width. This eliminates waste. They may be cut from other anodic material, e. g. magnesium.

The thin conductive coating plate 17 is composed of conventional materials, for example, of powdered carbon or graphite suspended in a synthetic resin binder such as polyvinyl chloride or polythene arranged in strip sheet form of the desired width from which successive plates 17 of the required length are cut as needed. The face of plate 17 which is to be united with the anode plate 16 and the under surface of the marginal flange 15 is rendered tacky by application thereto of any suitable solvent for the binder such as trichloroethylene or of an appropriate adhesive such as a conductive cement which consists of a mixture of a conductive pigment such as graphite or acetylene black dispersed in any suitable solvent such as a ketone or an ester or mixture thereof containing a thermoplastic cement admixed therewith. The conductive cement or adhesive instead may be any of the electrically conductive rubber compositions formed of natural rubber or synthetic elastomers.

Each unit 18 consisting each of a tray with an anode plate 16 at its bottom united to an externally located conductive coating palte 17 (Fig. 11) is now ready to receive the other cell constituents and to be assembled into battery blocks.

Of the other cell constituents one is a thin separator 19 of porous or bibulous paper (Fig. 5). Each separator 19 is rectangular in shape with lateral and longitudinal dimensions each slightly in excess of the corresponding internal wall dimensions of tray 13 so that it may be shaped into a shallow dish that can be inserted into the tray 13 above the anode plate 16. This shallow dish shape is provided for reasons to be described. These separators 19 are cut successively from a roll whose width corresponds to the desired lateral dimension of the separators. The paper strip of the roll is coated on one face with a film 20 consisting of jellified electrolyte of usual kind. This film 20 is conveniently applied to the paper strip of a roll by unwinding the latter and applying the film as a coating during its unwinding. The electrolyte film bearing strip is then dried and rewound. Subsequently the film-coated individual separators 19 are severed from the strip in the roll.

The other constituent comprises a mix cake 21 containing the usual materials of a depolarizing mix, namely, carbon and manganese dioxide, ammonium chloride and water. The mix cake 21 has a shape and peripheral dimensions substantially like those of the anode plate 16. It is materially thicker than any of the other components for reasons to be described. The individual mix cakes 21 preferably as needed are cut by a hollow punch from a strip of polarizing mix obtained by rolling of the ingredients of the mix cake into a flat strip of required thickness. By rolling the mix cake to desired thickness and then punching out individual cakes as required, the water content of each mix cake 21 is retained. This is in contrast to the preparation of mix cakes by moulding with pressure which causes extrusion of the water content. Later when the soft, punched-out moist mix cakes are assembled to form cells, their water content which is considerably higher than that of a moulded mix cake, in each cell diffuses through the porous paper separator 19 thereof to humidify the jellified electrolyte 20 on such separator. No additional humidification is needed during assembly and no water is lost during sealing of trays together.

In assembling the tray units 18 with the cell components to form battery blocks 10 the following procedure is employed.

A high frequency welding arrangement (Figs. 12a and 12b) comprising a tubular barrel 30 having substantially rectangular internal section through which the trays 13 may move is provided. A movable bottom or piston 31 fits internally of the barrel 30. A movable pressure piston 32 serving simultaneously as a high frequency current carrying electrode is movable downwardly and upwardly toward and away from the upper mouth 33 of said barrel. Reciprocally movable side electrodes 34 one for each barrel face are movable perpendicularly to the barrel axis just above its mouth 33 toward and away from the sides of the movable electrode 32.

A tray 13 is placed on the barrel 30 so that its bottom flange 15 rests on the upper surface of the piston 31. The level of piston 31 is then adjusted so that the upper peripheral rim edges of the side walls of tray 13 project above the level of the mouth 33.

A rectangularly shaped insulating plate 35 dimensioned to fit into the tray 13 is positioned in the latter lying on the internal surfaces of flanges 15. The plate 35 is preferably of the same material as tray 13 and has a center hole 36. A metallic plate 16 is placed over plate 35.

A tray 13 of a tray unit 18 is then nestedly deposited on the tray 13 so that the upper peripheral edges of the side walls of tray 13 are in full contact with the side walls of tray 13 of tray unit 18 near its bottom periphery. The upper electrode 32 is then lowered into the tray 13 against the anode plate 16 to bring upper tray 13 and, with it the lower tray 13 in which it nests together and to bring the overlapping contact junction of upper peripheral edges of the side walls of lower tray 13 and the bottom periphery of upper tray 13 to a level just above that of the mouth 33 of said barrel. Upward pressure of a determined amount is then exerted through the movable piston 31 to maintain the overlapping junction and simultaneously the side electrodes 34 are moved inwardly toward the electrode 32 to press the overlapping edges of bottom tray 13 against the walls of upper tray 13 and toward the electrode 32 while the electrodes are connected to a high frequency electric source (not shown). This establishes a heating electric field which causes fusion or welding of the lapping edges of lower tray 13 to the upper tray 13 at their overlapping junction.

When this welding has been effected, the side electrodes are moved outwardly and the electrode 32 is moved upwardly to clear the mouth of tray 13.

Then a separator 19 with its jellified electrolyte coating 20 outermost is inserted into tray 13 being pushed down to bring its coating 20 into contact with anode plate 16. The dish shaped separator fits the inner wall dimensions of tray 13. A cake mix 21 is then inserted into the dish shaped separator 19 to rest on its bottom. The dish shape of the separator 19 spanning the tray in all directions serves to prevent all possibility of direct contact between the mix cake 21 and zinc plate 16. The thickness of cake mix 21 is such that its upper surface then lies slightly below the upper peripheral wall edges of tray 13. Another tray unit 18 is then superposed on the tray 13, its tray component 13 nesting within the upper peripheral wall edges of the preceding tray 13. Its coating plate 17 is made to contact the entire upper surface of the cake mix. The electrode 32 is then moved downwardly again into the upper tray 13 to shift the assembled trays and components downwardly in barrel 30 until the junction between engaging or overlapping edges of the preceding tray 13 and the bottom of the upper tray 13 lie just above the mouth 33 of barrel 30. Upward pressure of a predetermined value is then exerted against the assembly by the lower piston 31 to press the surface of coating 17 into firm and uniform contact with the mix cake 21 directly below it and, also, to maintain the overlapping junction between the two trays 13. While this pressure is so maintained the side electrodes 34 are moved toward the electrode 32 for effecting a fused or welded joint between the lapping edges of the preceding or undermost tray 13 and the bottom of the upper tray 13 at their junction through the agency of the high frequency electric field. When the joint is completed at said junction the electrodes 34 are moved outwardly away from electrode 32 and the latter is withdrawn from upper tray 13.

The uppermost tray 13 is then loaded in the same way successively with a separator 19, a cake mix 21 and a tray unit 18 and this assembly is then pushed into barrel 30 by the electrode 32 until the junction of the overlapping edges of the second tray and the bottom of the third tray lies just above the barrel mouth 33. The same determined upward pressure previously exerted is now applied for the same purposes by the bottom piston 31 and the welding or fusion of the edges at said last-named junction of the second tray 13 to the bottom of the third tray is effected.

Individual tray units 18 and their component elements are thus successively assembled with those previously assembled in the pile. When the required number of tray units have been successively assembled and united as just described to produce a block 10 having the desired output rating the uppermost tray unit 13 is left unfilled by the usual cell components, namely separator 19 and mix cake 21. Instead a small plastic insulating plate 35a identical with that used in bottom tray 13 is deposited on the uppermost surface of upper anode or zinc plate 16. The side walls of the uppermost tray 13b as seen in Fig. 3 are then folded over the border of the plate 35a and welded to it and each other to complete the battery block 10. Any number of blocks 10 may, as shown in Fig. 4, be mounted in an overall casing 40 of paper, metal or plastic material to provide a multi-block battery 41 of desired voltage. Suitable electrical connections not shown between blocks are, of course, made and terminals 42 and 43 are provided.

In general, it can be said that broadly speaking the process of the instant application comprises the piling up of flat cells which for a cell of the order $n$ comprises placing the components of said $n$th cell upon the first $(n-1)$ piled up and fully completed and united cells, forming an insulating tight casing around said $n$th cell components under a calculated pressure and also producing with the peripheral external parts of the casings of the first $(n-1)$ cells all previously welded to each other a single unitary insulating casing for all the $n$ piled up cells forming a battery block 10.

Outstanding features of the battery block 10 manufactured as just described are its unitary outer envelope or enclosure consisting solely of the united, fused or welded individual trays 13 which effectively seal off the contents of the individual trays from each other and from atmospheric environments. No auxiliary bands or tapes are required to maintain the assembly in its final form. In addition, since each succeeding pair of trays has been welded together under a fixed determined like pressure, entire uniformity of contact between required components in all cells exists and uniform low ohmic cell resistance is a characteristic of all the cells. Furthermore, since the plastic material used in formation of the trays 13 is comparatively thin (of the order of 0.15 mm. thickness) the side walls of the trays allow for diffusion of hydrogen which is slowly evolved during the shelf life of the battery. If these walls were thick (the case when molded trays are used), such diffusion can only occur with difficulty and leads to bulges and distortions.

The cell blocks 10 as produced all are uniquely uniform in dimensions and substantially identical in all their required performance characteristics. The components of every individual cell in any cell block are under identical compression because each cell has been individually assembled with other cells under identical pressure conditions rather than by exertion of a single pressure at one time to an entire pile of cells during union. The latter practice does not provide uniform pressure distribution to the components of individual cells. Also, cell to cell electrolyte leakage likely to result from the pressure distribution with single pressure practice is likely to prevent tight sealing off of individual cells from the others.

The process of this invention as above described also includes the advantages of complete use of available volume (less than 5% is filled with inert materials), and low manufacturing cost.

In addition, the process described may be extended to the manufacture of other types of electrochemical generators besides the typical carbon, manganese dioxide, ammonium chloride, zinc cell being, for example, suitable particularly also, to the manufacture of deferred action cells and air depolarized cells. With other types of cells, properly perforated plastic strips may be utilized for manufacture of the trays of the cells as herein described.

It is to be understood too that the process of cell assembly herein described is applicable as well to components having circular or other shapes as well as to those which are rectangular as hereinabove described.

While specific embodiments of the invention have been described, other variations in practice within the scope of the appended claims are possible and are contemplated. There is no intention, therefore, of limitation to the details shown and described.

What is claimed is:

1. That improvement in the process of preparing a battery block comprising $n$ piled flat cells including providing $n+1$ trays of thermoplastic material each having a depth in excess of the depth of a completed cell and a bottom opening and each being provided interiorly at its bottom with an anode plate overlying the bottom opening, and exteriorly on its bottom with a conductive coating plate united both to the bottom and to the anode plate appearing in the opening, loading a first of said trays with an electrolyte carrying separator and a mix cake as components of the first of said cells, nesting a second of said trays in the first so that upper wall portions of the first tray lap only the lower wall portions of the second tray and so that the conductive coating plate of the second tray is in surface contact with the mix cake in the first tray, applying a predetermined amount of compression to the cell components between the two trays and simultaneously providing internal support for the lapped portions and externally applied, lateral pressure with heat to said lapped portions against said support for uniting said lapped portions of the two trays permanently to complete the first of the cells, thereafter successively and independently repeating the loading, nesting, compression and union to complete each of the succeeding cells until $n$ piled cells have been prepared with the $n+1$ trays, all of the successive compressions utilizing like pressure and each union serving independently to unite the uppermost of the piled trays to the next preceding tray of the already united trays of preceding cells so that when $n$ cells are completed a unitary overall covering for all the cells is defined by the united wall portions of the $n+1$ individual trays, and the components of each individual cell are maintained in required contact with each other and those of adjacent cells at substantially identical pressures.

2. That improvement in the process of preparing battery blocks comprising $n$ piled flat cells including providing $n+1$ trays of thermoplastic material each having a depth in excess of the depth of a completed cell and a bottom opening and each being provided interiorly at its bottom with an anode plate overlying the bottom opening and exteriorly on its bottom with a conductive coating plate united both to the bottom and to the anode plate appearing in the opening, loading a first of said trays with an electrolyte carrying separator and a mix cake as components of the first of said cells, nesting a second of said trays in the first so that the upper wall portions of the first tray lap only the lower wall portions of the second tray and so that the conductive coating plate of the second tray is in full surface contact with the mix cake in the first tray, applying a predetermined amount of compression to the cell components between the two trays and simultaneously providing internal support for said lapped portions and externally applied, lateral pressure with heat to said lapped portions against said support for lapped portions of the two trays by heat fusion to complete the first of the cells, thereafter successively and independently repeating the loading, nesting, compression and heat fusion to complete each of the succeeding cells until $n$ piled cells have been completed with the $n+1$ trays, all of the successive compressions utilizing like pressure and each heat fusion serving independently to unite the uppermost of the piled trays to the next preceding tray of the already united trays of preceding cells so that when $n$ cells are completed a unitary overall covering for all the cells is defined by the heat fused wall portions of the $n+1$ individual trays, and the components of each individual cell are maintained in required contact with each other and those of adjacent cells at substantially identical pressures.

3. The improvement of claim 2 wherein each tray is prepared individually from a specific length of thermoplastic strip material cut from a roll of such material, each strip length being folded into tray shape after its severance from the roll.

4. The improvement of claim 2 including preparation of each tray individually by severance of a required strip length from a roll of thermoplastic strip material, each strip length being folded into tray shape on a shaping mandrel after its severance from the roll.

5. The improvement of claim 2 including preparation of each tray individually by severance of a specific strip length from a roll of thermoplastic strip material by folding each strip length into tray shape on a shaping mandrel after its severance from the roll, thereafter inserting an anode plate into the tray and uniting a conductive coating plate with the anode plate under pressure, each anode plate being severed in needed length from anode strip material already having desired width, and each conductive coating plate similarly being severed in needed length from conductive coating plate material already having desired width.

6. The improvement of claim 2 including preparation of each separator by coating a surface of a strip of bibulous paper material with jellified electrolyte, drying the coating, and subsequently severing independent separators of required length from such strip.

7. The improvement of claim 2 wherein the cake mix is stamped out into required shape from a rolled body of required thickness comprising a mixture of carbon, manganese dioxide, ammonium chloride and water.

8. A process of preparing batteries consisting of a pile of flat cells each including a tray of thermoplastic material serving as a receptacle for other cell components comprising the steps of first nesting a second tray into a preceding tray already containing its required components so that said preceding tray laps only the lower portions of said second tray, secondly applying a predetermined pressure between the nested trays and providing temporary internal support for the lapping portions and thirdly while maintaining said support and pressure and also applying heat and lateral external pressure to the supported lapping portions and thereby permanently uniting the nested trays along their lapping portions, fourthly inserting the required components into the second tray, fifthly nesting a third tray with the second tray so that said second tray laps only the lower portions of the third tray, sixthly applying the same predetermined pressure between the third nested tray and the previously united preceding trays and seventhly while maintaining the last-named pressure uniting the third nested tray with the second tray along their lapping portions, and thereafter repeating the said fourth to seventh steps in sequence with each additional succeeding tray and its required components until a battery of the required number of cells has been prepared.

9. That improvement in the process of preparing a battery block comprising $n$ piled flat cells including providing $n+1$ trays of thermoplastic material each having a depth somewhat in excess of the depth of a cell of such block but less than the depth of two cells, said trays each being provided interiorly at its bottom with an anode plate and exteriorly on its bottom with a conductive coating united with the anode plate, loading a first of said trays with an electrolyte, a porous separator and a mix cake as components of the first of said cells, nesting a second of said trays in the first so that the upper edge portions of the first tray lap only the lower wall portions of the second tray and so that the conductive coating of the second tray is in surface contact with the mix cake in the first tray, applying a predetermined amount of compression to the cell components between the two trays and simultaneously providing internal support for said lapped portions and externally-applied, lateral pressure with heat to said lapped portions against said support for uniting the lapped portions of the two trays by fusion of the thermoplastic material thereof to complete the first of the cells, thereafter successively and independently repeating the loading, nesting, compression and fusion to complete each of the succeeding cells until $n$ piled cells have been completed with the $n+1$ trays, all of the successive compression steps utilizing like pressure and each fusion step serving independently to unite the uppermost of the piled trays to the next preceding tray of the already united trays of preceding cells so that when $n$ cells are completed a unitary overall covering for all the cells is defined by the fused wall portions of the $n+1$ individual trays, and the components of each individual cell are maintained in required contact with each other and those of adjacent cells at substantially identical pressures.

10. As an article of manufacture an uncased, self-supporting, stacked battery block consisting of individual cells prepared and assembled in accord with the method of claim 1.

11. As an article of manufacture an uncased, self-supporting, stacked battery block consisting of individual cells prepared and assembled in accord with the method of claim 2.

12. As an article of manufacture a battery consisting of a pile of flat cells prepared and asembled in accord with the method of claim 8.

13. As an article of manufacture an uncased, self-supporting, stacked battery block consisting of $n$ piled flat cells made of $n+1$ trays all prepared and assembled in accord with the method of claim 9.

References Cited in the file of this patent

UNITED STATES PATENTS

| | | |
|---|---|---|
| 1,173,763 | Baker | Feb. 29, 1916 |
| 2,307,765 | Deibel | Jan. 12, 1943 |
| 2,307,766 | Deibel | Jan. 12, 1943 |
| 2,416,576 | Franz et al. | Feb. 25, 1947 |
| 2,475,152 | Rock | July 5, 1949 |
| 2,593,893 | King | Apr. 22, 1952 |
| 2,645,676 | Emeriat | July 14, 1953 |
| 2,649,492 | Linton | Aug. 18, 1953 |
| 2,684,397 | Gottschall | July 20, 1954 |
| 2,705,250 | Kirkman | Mar. 29, 1955 |
| 2,762,858 | Wood | Sept. 11, 1956 |

UNITED STATES PATENT OFFICE

CERTIFICATE OF CORRECTION

Patent No. 2,834,827                                                      May 13, 1958

Raymond Emeriat

It is hereby certified that error appears in the printed specification of the above numbered patent requiring correction and that the said Letters Patent should read as corrected below.

Column 3, line 5, for "folowing" read -- following --; column 4, line 28, for "palte" read -- plate --; column 8, line 7, before "lapped" insert -- uniting said --.

Signed and sealed this 5th day of August 1958.

(SEAL)
Attest:

KARL H. AXLINE                                            ROBERT C. WATSON
Attesting Officer                                    Commissioner of Patents